(12) United States Patent
Tang

(10) Patent No.: US 11,747,799 B2
(45) Date of Patent: Sep. 5, 2023

(54) INDUSTRIAL CONTROL SYSTEM AND NETWORK SECURITY MONITORING METHOD THEREFOR

(71) Applicant: Siemens Aktiengesellschaft, Munich (DE)

(72) Inventor: Wen Tang, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 144 days.

(21) Appl. No.: 16/616,034

(22) PCT Filed: May 31, 2017

(86) PCT No.: PCT/CN2017/086675
§ 371 (c)(1),
(2) Date: Nov. 22, 2019

(87) PCT Pub. No.: WO2018/218537
PCT Pub. Date: Dec. 6, 2018

(65) Prior Publication Data
US 2020/0089204 A1 Mar. 19, 2020

(51) Int. Cl.
*G05B 23/02* (2006.01)
*H04L 9/40* (2022.01)
*H04L 41/28* (2022.01)

(52) U.S. Cl.
CPC ........ *G05B 23/027* (2013.01); *H04L 63/1425* (2013.01); *H04L 63/1441* (2013.01); *H04L 63/20* (2013.01)

(58) Field of Classification Search
CPC . H04L 63/20; H04L 63/1441; H04L 63/1425; H04L 63/1416; H04L 63/1433; H04L 43/08; G05B 23/027; G06N 20/00
See application file for complete search history.

(56) References Cited

U.S. PATENT DOCUMENTS 7,418,354 B1 * 8/2008 Greenlee ............. G01M 3/2807
73/40.5 R
10,489,711 B1 * 11/2019 Inbar ..................... H04L 41/142
(Continued)

FOREIGN PATENT DOCUMENTS

CN 103439933 A 12/2013
CN 104702460 A 6/2015
(Continued)

OTHER PUBLICATIONS

Vollmer et al., "Cyber-Physical System Security With Deceptive Virtual Hosts for Industrial Control Networks," IEEE Transactions on Industrial Informatics Year: 2014 | vol. 10, Issue: 2 | Journal Article | Publisher: IEEE.*
(Continued)

*Primary Examiner* — Roderick Tolentino
(74) *Attorney, Agent, or Firm* — Harness, Dickey & Pierce, P.L.C.

(57) ABSTRACT

The present invention relates to the technical field of industrial networks and information security, and in particular to an industrial control system and a network security monitoring method therefor, for effectively monitoring the network security of an industrial control system. The method comprises: selecting at least one first data source related to an industrial control system and acquiring first data therefrom; counting time-varying features of the first data to serve as a behavior model for the industrial control system; acquiring second data from some or all of the at least one first data source; and determining whether the second data has the features described by the behavior model, and if so, determining that the industrial control system exhibits normal behavior, and if not, determining that the industrial control system exhibits abnormal behavior. In consideration of the certainty of the behavior of the industrial control system, a system behavior model is obtained by means of (Continued)

counting. A judgement regarding an abnormal system behavior is made based on the relatively determined behavior model, so that the obtained determination result is more accurate.

22 Claims, 4 Drawing Sheets

(56) References Cited

U.S. PATENT DOCUMENTS

| | | | |
|---|---|---|---|
| 10,530,749 B1* | 1/2020 | Park | H04L 63/0245 |
| 2007/0050777 A1* | 3/2007 | Hutchinson | G06F 11/0781 |
| | | | 718/104 |
| 2011/0288692 A1 | 11/2011 | Scott | |
| 2014/0277612 A1* | 9/2014 | Justin | G05B 23/0291 |
| | | | 700/79 |
| 2015/0033282 A1* | 1/2015 | O'Hern | H04W 12/37 |
| | | | 726/1 |
| 2015/0350232 A1* | 12/2015 | Liu | H04L 63/1433 |
| | | | 726/23 |
| 2016/0050225 A1* | 2/2016 | Carpenter | G06F 21/577 |
| | | | 726/25 |
| 2016/0164906 A1* | 6/2016 | Pinney Wood | G06F 21/552 |
| | | | 726/25 |
| 2016/0350559 A1* | 12/2016 | Wilkinson | G06F 21/70 |
| 2017/0220801 A1 | 8/2017 | Stockdale et al. | |

FOREIGN PATENT DOCUMENTS

| | | |
|---|---|---|
| CN | 104883346 A | 9/2015 |
| CN | 105915402 A | 8/2016 |
| CN | 106209843 A | 12/2016 |
| CN | 106603531 A | 4/2017 |
| WO | WO 2011146284 A2 | 11/2011 |
| WO | WO 2016020660 A1 | 2/2016 |

OTHER PUBLICATIONS

Sailo et al., "Network Security Analysis Using Behavior History Graph," 2014 Ninth International Conference on Availability, Reliability and Security Year: 2014 | Conference Paper | Publisher: IEEE.*
Extended European Search Report dated Nov. 2, 2020.
International Search Report PCT/ISA/210 for International Application No. PCT/CN2017086675 dated May 31, 2017.
Written Opinion of the International Searching Authority PCT/ISA/237 for International Application No. PCT/CN2017/OB6675 dated May 31, 2017.

* cited by examiner

INDUSTRIAL CONTROL SYSTEM AND NETWORK SECURITY MONITORING METHOD THEREFOR

PRIORITY STATEMENT

This application is the national phase under 35 U.S.C. § 371 of PCT International Application No. PCT/CN2017/086675, which has an International filing date of May 31, 2017, the entire contents of which are hereby incorporated herein by reference.

FIELD

Embodiments of invention generally relate to the technical field of industrial networks and information security, and in particular to an industrial control system and a network security monitoring method therefor.

BACKGROUND

An industrial control system (ICS) is used to implement automatic control of industrial processes. An industrial control system may be a wind power generation system, a vehicle manufacturing workshop, a pharmaceutical factory, a wastewater treatment system in a city, etc.

Traditional industrial control systems are closed, and it is difficult for external attacks to pose security threats to critical devices such as an industrial controller in the industrial control system. Therefore, traditional industrial control systems have a low requirement for network security. In modern industrial control systems, a large number of network technologies and commercial components are employed, so that the modern industrial control systems can be connected to other networks including the Internet, which makes it possible for external network attacks to tamper with a control process of an industrial controller, thereby causing damages to an industrial device, and thus severely affecting the normal running of the industrial control systems. Therefore, knowing how to avoid external network attacks becomes notably important.

In order to effectively repel the external network attacks and guarantee a critical industrial control system and a control process thereof, a feasible method is first monitoring the network security of the industrial control system to identify possible network attacks.

SUMMARY

Embodiments of the present invention provide an industrial control system and a network security monitoring method therefor, for effectively monitoring the network security of an industrial control system.

In a first embodiment, a method for monitoring the network security of an industrial control system is provided.

The method comprises: selecting at least one first data source related to the industrial control system, wherein the at least one first data source is used for measuring whether the industrial control system meets a network security requirement; acquiring first data from the at least one first data source; counting time-varying features of the first data to serve as a behavior model for the industrial control system; acquiring second data from some or all of the at least one first data source; and determining whether the second data has the features described by the behavior model, and if so, determining that behavior of the industrial control system that is represented by the second data is normal behavior, and if not, determining that the behavior is abnormal behavior.

In a second embodiment, an alarming method in an industrial control system is provided.

The method may comprise: determining a level of an alarm generated in the industrial control system; and triggering alarm reporting if the level of the alarm is higher than a preset lowest alarm priority level, otherwise, skipping triggering alarm reporting;

wherein the levels of the alarms in descending order of priorities sequentially comprise at least two of the following levels: a first level, wherein alarms at the first level comprise alarms related to an industrial controller in the industrial control system; a second level, wherein alarms at the second level comprise alarms in an industrial control network in the industrial control system; a third level, wherein alarms at the third level comprise alarms related to an industrial host in the industrial control system; a fourth level, wherein alarms at the fourth level comprise alarms related to a back-end firewall, server and/or application in a demilitarized zone, and the demilitarized zone is used for separating the industrial control system from an enterprise network of the industrial control system; and a fifth level, wherein alarms at the fifth level comprise alarms related to a front-end firewall in the demilitarized zone.

In a third embodiment, a network security monitoring system for an industrial control system is provided. The network security monitoring system can be used to implement the method provided in the first embodiment or any possible implementation of the first embodiment. The system may comprise:

a data source selection module for selecting at least one first data source related to the industrial control system, wherein the at least one first data source is used for measuring whether the industrial control system meets a network security requirement;

a data acquisition module for acquiring first data from the at least one first data source;

a model generation module for counting time-varying features of the first data to serve as a behavior model for the industrial control system, wherein the data acquisition module is further used for acquiring second data from some or all of the at least one first data source; and an abnormal behavior determination module for determining whether the second data has the features described by the behavior model, and if so, determining that behavior of the industrial control system that is represented by the second data is normal behavior, and if not, determining that the behavior is abnormal behavior.

In a fourth embodiment, a network security monitoring system for an industrial control system is provided, which comprises:

at least one memory for storing machine-readable instructions; and at least one processor for invoking the machine-readable instructions to carry out the method provided in the first embodiment or any possible implementation of the first embodiment.

In a fifth embodiment, an alarm processing apparatus in an industrial control system is provided, which comprises:

an alarm level determination module for determining a level of an alarm generated in the industrial control system; and an alarm reporting module for triggering alarm reporting when the level of the alarm is higher than a preset lowest alarm priority level, and skipping triggering alarm reporting when the level of the alarm is not higher than the preset lowest alarm priority level, wherein the levels of the alarms in descending order of priority sequentially comprise at least two of the following first to fifth levels: alarms at the first level comprise alarms related to an industrial controller in the industrial control system; alarms at the second level comprise alarms in an industrial control network in the industrial control system; alarms at the third level comprise alarms related to an industrial host in the industrial control system; alarms at the fourth level comprise alarms related to a back-end firewall, server and/or application in a demilitarized zone, and the demilitarized zone is used for separating the industrial control system from an enterprise network of the industrial control system; and alarms at the fifth level comprise alarms related to a front-end firewall in the demilitarized zone.

In a sixth embodiment, an alarm processing apparatus in an industrial control system is provided, which comprises:

at least one memory for storing machine-readable instructions; and at least one processor for invoking the machine-readable instructions to carry out the method provided in the second embodiment in claims.

In a seventh embodiment, a machine-readable medium is provided, which has machine-readable instructions stored thereon, wherein the machine-readable instructions carry out, when invoked by a processor, the method provided in the first embodiment, any possible implementation of the first embodiment, the second embodiment, or any possible implementation of the second embodiment.

LIST OF REFERENCE NUMERALS

Figure 1A:
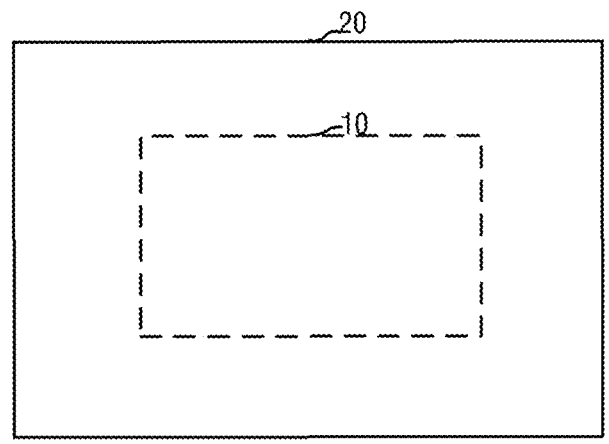
FIGS. 1A to 1C show three manners of deploying a network security monitoring system into an industrial control system in an embodiment of the present invention.

| 10: Network security monitoring system | 20: Industrial control system | |
|---|---|---|
| S201: Selecting a data source | S202: Acquiring first data | |
| S203: Obtaining a behavior model based on the first data by way of counting | | S204: Acquiring second data |
| S205: Making a judgment regarding an abnormal behavior based on the second data and the behavior model | | |
| 201: Industrial controller | 202a: Sensor | 202b: Electric motor |
| 200a: Engineer station | 200b: Database server | 200c: Application server |
| 204a: Firewall | 204b: Server that performs intrusion detection | |
| 205: Network switching and routing device | | |
| 30: Demilitarized zone | 301: Front-end firewall | 302: Back-end firewall |
| 300a: FTP server | 300b: Mail server | |
| 40: Enterprise network | | |
| S401: Determining an alarm level | S402: Comparing the alarm levels | S403: Triggering alarm reporting |
| L1: First level | L2: Second level | L3: Third level |
| L4: Fourth level | L5: Fifth level | |
| 601: Attack source | 602: Security threat | 603: Attack target |
| 101: Data source selection module | 102: Data acquisition module | 103: Model generation module |
| 104: Abnormal behavior determination module | 105: Alarm processing module | 106: Attack source positioning module |
| 501: Alarm level determination module | 502: Alarm reporting module | 108, 503: At least one memory |
| 109, 504: At least one processor | 107: Attack phase determination module | |

DETAILED DESCRIPTION OF EXAMPLE EMBODIMENTS

In a first embodiment, a method for monitoring the network security of an industrial control system is provided.

The method comprises: selecting at least one first data source related to the industrial control system, wherein the at least one first data source is used for measuring whether the industrial control system meets a network security requirement; acquiring first data from the at least one first data source; counting time-varying features of the first data to serve as a behavior model for the industrial control system; acquiring second data from some or all of the at least one first data source; and determining whether the second data has the features described by the behavior model, and if so, determining that behavior of the industrial control system that is represented by the second data is normal behavior, and if not, determining that the behavior is abnormal behavior.

In consideration of the certainty of the behavior of the industrial control system, and based on the certainty of such a behavior, a behavior model for the industrial control system is obtained by way of counting, and the behavior model also has definite certainty. A judgement regarding an abnormal system behavior is made based on the relatively determined behavior model, so that the obtained determination result is more accurate. Moreover, in the embodiments of the present invention, a data source related to the industrial control system is properly selected, and data is acquired from the selected data source, so that the behavior model for the industrial control system is determined according to the acquired data. Then, based on the determined data model, it is determined whether the industrial control system exhibits abnormal behavior. Effective monitoring of the network security of the industrial control system can be thus implemented.

Firstly, during the selection of a data source, a data source that can measure whether the industrial control system meets a network security requirement is selected, so that data used as a basis during subsequent judgment regarding an abnormal system behavior can more cater to the need for network security, and a determination result is more accurate. Secondly, when the industrial control system is not subjected to a network attack, data is acquired from the selected data source, and then time-varying features of the acquired data are counted to serve as a behavior model for the industrial control system. In this way, a normal behavior feature of the system can be accurately learned, so that the determination result for the abnormal system behavior that is obtained during subsequent feature comparison is more accurate.

Optionally, in the method, the at least one first data source related to the industrial control system can be selected according to at least one of the following factors: at least one running indicator of the industrial control system that is defined by a customer of the industrial control system; at least one network security policy of the industrial control system that is defined by the customer of the industrial control system; a normal running process of the industrial control system; configuration information of at least one constituent part of the industrial control system; and a network attack that the industrial control system may be subjected to.

Here, various sources of the data source are given.

Optionally, the at least one first data source comprises: a log of at least one industrial host in the industrial control system, and/or network traffic captured from at least one critical network position in the industrial control system, and/or a security log of at least one security protective device in the industrial control system, and/or a network log of at least one network switching and routing device in the industrial control system.

If the at least one first data source comprises the log of the at least one industrial host in the industrial control system, the first data can be acquired from the at least one first data source in the following manner: acquiring, for each of the at least one industrial host, at least one piece of the following data from a log of the industrial host to serve as the first data of the industrial host: hardware performance data during running of the industrial host; file input/output information during running of the industrial host; a processing flow for an industrial application program running on the industrial host; and a resource in the industrial control system that is accessed by the industrial application program running on the industrial host.

If the at least one first data source comprises the network traffic captured from the at least one critical network position in the industrial control system, the first data can be acquired from the at least one first data source in the following manner: determining, for each of the at least one critical network position, at least one piece of the following information of the network traffic to serve as the first data of the critical network position: a source address of a data packet in the network traffic; a destination address of the data packet in the network traffic; a function code of an industrial control communication protocol used by the network traffic; and application layer data in the network traffic.

For this case, optionally, the behavior model can be used to describe at least one of the following features of communication within the industrial control system: a communication flow between an industrial host and an industrial controller in the industrial control system; a function performed by an industrial application program in the industrial control system; and the state of an industrial device in the industrial control system and the state of a process variable monitored by the industrial device.

If the at least one first data source comprises the log of the at least one industrial host in the industrial control system, the first data can be acquired from the at least one first data source in the following manner: acquiring at least one piece of the following information from the at least one industrial host to serve as the first data: information for logging in and/or logging out of the industrial control system by a user by way of the at least one industrial host; a control command executed by the user on the at least one industrial host for the industrial control system; and data in the industrial control system that is accessed by the user by way of the at least one industrial host.

For this case, the behavior model is used to describe at least one of the following features of user behavior of the industrial control system: a working time; a normal operation; and a data acquisition mode.

Different implementations for various data sources are given above, and specific implementations for acquiring data are provided above for different data sources.

Different behavior models are established for different data sources, and the established behavior models can embody behavior features of the industrial control system, such that a determination result is more accurate when it is determined, according to data collected in real time, whether the behavior is abnormal.

Optionally, after it is determined that the behavior of the industrial control system that is represented by the second data is abnormal behavior, a level of an alarm corresponding to the behavior of the industrial control system that is represented by the second data can be further determined; and if the determined level is higher than a preset lowest alarm priority level, alarm reporting is triggered, otherwise, alarm reporting is not triggered.

For this optional solution, a possible implementation is that the levels of the alarms in descending order of priorities sequentially comprise at least two of the following first to fifth levels: alarms at the first level comprise alarms related to an industrial controller in the industrial control system; alarms at the second level comprise alarms in an industrial control network in the industrial control system; alarms at the third level comprise alarms related to an industrial host in the industrial control system; alarms at the fourth level comprise alarms related to a back-end firewall, server and/or application in a demilitarized zone, and the demilitarized zone is used for separating the industrial control system from an enterprise network of the industrial control system; and alarms at the fifth level comprise alarms related to a front-end firewall in the demilitarized zone.

In this way, a policy for alarm reporting can be set in advance, and the alarms can be selectively reported, so that the implementation of alarm reporting is more flexible, and excessive alarm reporting can be effectively avoided.

Optionally, after it is determined that the behavior of the industrial control system that is represented by the second data is abnormal behavior, it can be further determined whether the behavior of the industrial control system that is represented by the second data is a network attack, and if so, an attack source is positioned according to an object targeted by the behavior of the industrial control system that is represented by the second data.

In this way, the attack source of the network attack can be effectively positioned.

Optionally, after it is determined that the behavior of the industrial control system that is represented by the second data is abnormal behavior, it can be further determined whether the behavior of the industrial control system that is represented by the second data is a network attack; and if so, a network attack phase of the behavior of the industrial control system that is represented by the second data is determined, wherein different network attack phases pose different levels of threat to the industrial control system.

In this way, the network attack phase can be clearly determined, so that corresponding security measures can be subsequently taken for different network attack phases.

In a second embodiment, an alarming method in an industrial control system is provided.

The method may comprise: determining a level of an alarm generated in the industrial control system; and triggering alarm reporting if the level of the alarm is higher than a preset lowest alarm priority level, otherwise, skipping triggering alarm reporting;

wherein the levels of the alarms in descending order of priorities sequentially comprise at least two of the following levels: a first level, wherein alarms at the first level comprise alarms related to an industrial controller in the industrial control system; a second level, wherein alarms at the second level comprise alarms in an industrial control network in the industrial control system; a third level, wherein alarms at the third level comprise alarms related to an industrial host in the industrial control system; a fourth level, wherein alarms at the fourth level comprise alarms related to a back-end firewall, server and/or application in a demilitarized zone, and the demilitarized zone is used for separating the industrial control system from an enterprise network of the industrial control system; and a fifth level, wherein alarms at the fifth level comprise alarms related to a front-end firewall in the demilitarized zone.

In this way, a policy for alarm reporting can be set in advance, and the alarms can be selectively reported, so that the implementation of alarm reporting is more flexible, and excessive alarm reporting can be effectively avoided.

In a third embodiment, a network security monitoring system for an industrial control system is provided. The network security monitoring system can be used to implement the method provided in the first embodiment or any possible implementation of the first embodiment. The system may comprise:

a data source selection module for selecting at least one first data source related to the industrial control system, wherein the at least one first data source is used for measuring whether the industrial control system meets a network security requirement;

a data acquisition module for acquiring first data from the at least one first data source;

a model generation module for counting time-varying features of the first data to serve as a behavior model for the industrial control system, wherein the data acquisition module is further used for acquiring second data from some or all of the at least one first data source; and an abnormal behavior determination module for determining whether the second data has the features described by the behavior model, and if so, determining that behavior of the industrial control system that is represented by the second data is normal behavior, and if not, determining that the behavior is abnormal behavior.

In consideration of the certainty of the behavior of the industrial control system, and based on the certainty of such a behavior, a behavior model for the industrial control system is obtained by way of counting, and the behavior model also has definite certainty. A judgement regarding an abnormal system behavior is made based on the relatively determined behavior model, so that the obtained determination result is more accurate. Moreover, in the embodiments of the present invention, a data source related to the industrial control system is properly selected, and data is acquired from the selected data source, so that the behavior model for the industrial control system is determined according to the acquired data. Then, based on the determined data model, it is determined whether the industrial control system exhibits abnormal behavior. Effective monitoring of the network security of the industrial control system can be thus implemented.

Firstly, during the selection of a data source, a data source that can measure whether the industrial control system meets a network security requirement is selected, so that data used as a basis during subsequent judgment regarding an abnormal system behavior can more cater to the need for network security, and a determination result is more accurate. Secondly, when the industrial control system is not subjected to a network attack, data is acquired from the selected data source, and then time-varying features of the acquired data are counted to serve as a behavior model for the industrial control system. In this way, a normal behavior feature of the system can be accurately learned, so that the determination result for the abnormal system behavior that is obtained during subsequent feature comparison is more accurate.

Optionally, the data source selection module is specifically used for selecting the at least one first data source related to the industrial control system according to at least one of the following factors: at least one running indicator of the industrial control system that is defined by a customer of the industrial control system; at least one network security policy of the industrial control system that is defined by the customer of the industrial control system; a normal running process of the industrial control system; configuration information of at least one constituent part of the industrial control system; and a network attack that the industrial control system may be subjected to.

Here, various sources of the data source are given.

Optionally, the at least one first data source selected by the data source selection module comprises: a log of at least one industrial host in the industrial control system, and/or network traffic captured from at least one critical network position in the industrial control system, and/or a security log of at least one security protective device in the industrial control system, and/or a network log of at least one network switching and routing device in the industrial control system.

If the at least one first data source selected by the data source selection module comprises the log of the at least one industrial host in the industrial control system, the data acquisition module is specifically used for acquiring, for each of the at least one industrial host, at least one piece of the following data from the log of the industrial host to serve as the first data of the industrial host: hardware performance data during running of the industrial host; file input/output information during running of the industrial host; a processing flow for an industrial application program running on the industrial host; and a resource in the industrial control system that is accessed by the industrial application program running on the industrial host.

If the at least one first data source selected by the data source selection module comprises: the network traffic captured from the at least one critical network position in the industrial control system, the data acquisition module is specifically used for determining, for each of the at least one critical network position, at least one piece of the following information of the network traffic to serve as the first data of the critical network position: a source address of a data packet in the network traffic; a destination address of the data packet in the network traffic; a function code of an industrial control communication protocol used by the network traffic; and application layer data in the network traffic.

For this case, the behavior model generated by the model generation module is used to describe at least one of the following features of communication within the industrial control system: a communication flow between an industrial host and an industrial controller in the industrial control system; a function performed by an industrial application program in the industrial control system; and the state of an industrial device in the industrial control system and the state of a process variable monitored by the industrial device.

If the at least one first data source selected by the data source selection module comprises the log of the at least one industrial host in the industrial control system, the data acquisition module is specifically used for acquiring at least one piece of the following information from the at least one industrial host to serve as the first data: information for logging in and/or logging out of the industrial control system by a user by way of the at least one industrial host; a control command executed by the user on the at least one industrial host for the industrial control system; and data in the industrial control system that is accessed by the user by way of the at least one industrial host.

For this case, the behavior model generated by the model generation module is used to describe at least one of the following features of user behavior of the industrial control system: a working time; a normal operation; and a data acquisition mode.

Different implementations for various data sources are given above, and specific implementations for acquiring data are provided above for different data sources.

Different behavior models are established for different data sources, and the established behavior models can embody behavior features of the industrial control system, such that a determination result is more accurate when it is determined, according to data collected in real time, whether the behavior is abnormal.

Optionally, the network security monitoring system further comprises an alarm processing module, wherein after the abnormal behavior determination module determines that the behavior of the industrial control system that is represented by the second data is abnormal behavior, the alarm processing module is used for: determining a level of an alarm corresponding to the behavior of the industrial control system that is represented by the second data; and triggering alarm reporting if the determined level is higher than a preset lowest alarm priority level, otherwise, skipping triggering alarm reporting.

The levels of the alarms in descending order of priority sequentially comprise at least two of the following first to fifth levels: a first level, wherein alarms at the first level comprise alarms related to an industrial controller in the industrial control system; a second level, wherein alarms at the second level comprise alarms in an industrial control network in the industrial control system; a third level, wherein alarms at the third level comprise alarms related to an industrial host in the industrial control system; a fourth level, wherein alarms at the fourth level comprise alarms related to a back-end firewall, server and/or application in a demilitarized zone, and the demilitarized zone is used for separating the industrial control system from an enterprise network of the industrial control system; and a fifth level, wherein alarms at the fifth level comprise alarms related to a front-end firewall in the demilitarized zone.

In this way, a policy for alarm reporting can be set in advance, and the alarms can be selectively reported, so that the implementation of alarm reporting is more flexible, and excessive alarm reporting can be effectively avoided.

Optionally, the network security monitoring system further comprises an attack source positioning module, wherein after the abnormal behavior determination module determines that the behavior of the industrial control system that is represented by the second data is abnormal behavior, the attack source positioning module is used for: determining whether the behavior of the industrial control system that is represented by the second data is a network attack; and if so, positioning an attack source according to an object targeted by the behavior of the industrial control system that is represented by the second data.

In this way, the attack source of the network attack can be effectively positioned.

Optionally, the network security monitoring system further comprises an attack phase determination module, wherein after the abnormal behavior determination module determines that the behavior of the industrial control system that is represented by the second data is abnormal behavior, the attack phase determination module is used for: determining whether the behavior of the industrial control system that is represented by the second data is a network attack; and if so, determining a network attack phase of the behavior of the industrial control system that is represented by the second data, wherein different network attack phases pose different levels of threat to the industrial control system.

In this way, the network attack phase can be clearly determined, so that corresponding security measures can be subsequently taken for different network attack phases.

In a fourth embodiment, a network security monitoring system for an industrial control system is provided, which comprises:

at least one memory for storing machine-readable instructions; and at least one processor for invoking the machine-readable instructions to carry out the method provided in the first embodiment or any possible implementation of the first embodiment.

In a fifth embodiment, an alarm processing apparatus in an industrial control system is provided, which comprises:

an alarm level determination module for determining a level of an alarm generated in the industrial control system; and an alarm reporting module for triggering alarm reporting when the level of the alarm is higher than a preset lowest alarm priority level, and skipping triggering alarm reporting when the level of the alarm is not higher than the preset lowest alarm priority level, wherein the levels of the alarms in descending order of priority sequentially comprise at least two of the following first to fifth levels: alarms at the first level comprise alarms related to an industrial controller in the industrial control system; alarms at the second level comprise alarms in an industrial control network in the industrial control system;

alarms at the third level comprise alarms related to an industrial host in the industrial control system; alarms at the fourth level comprise alarms related to a back-end firewall, server and/or application in a demilitarized zone, and the demilitarized zone is used for separating the industrial control system from an enterprise network of the industrial control system; and alarms at the fifth level comprise alarms related to a front-end firewall in the demilitarized zone.

In this way, a policy for alarm reporting can be set in advance, and the alarms can be selectively reported, so that the implementation of alarm reporting is more flexible, and excessive alarm reporting can be effectively avoided.

In a sixth embodiment, an alarm processing apparatus in an industrial control system is provided, which comprises:

at least one memory for storing machine-readable instructions; and at least one processor for invoking the machine-readable instructions to carry out the method provided in the second embodiment in claims.

In a seventh embodiment, a machine-readable medium is provided, which has machine-readable instructions stored thereon, wherein the machine-readable instructions carry out, when invoked by a processor, the method provided in the first embodiment, any possible implementation of the first embodiment, the second embodiment, or any possible implementation of the second embodiment.

As described previously, industrial control systems may be used to implement automatic control of industrial processes, and may also be referred to as operations technology (OT) systems. Traditional industrial control systems are usually closed and have no connection to an external network, such as the Internet, and therefore, there is little or no consideration of the security of the system. However, with the development of digital technologies, automation technologies, and process control technologies, information technologies have been widely used in industrial control systems, and the industrial control systems have gradually become open and interconnected systems. For example: networks of joint venture companies or subsidiaries, or even service outsourcing companies, of an industrial enterprise, may be connected to an industrial control system of the industrial enterprise. Consequently, there is a risk of network attacks, and the industrial control system is faced with increasingly severe security threats. Therefore, there is an urgent need to protect the industrial control system from security attacks.

In known security solutions available to IT systems, security events generated from network hardware and application programs may be analyzed in real time, and corresponding security alarms can be generated. The security solutions are targeted at network devices, security protective devices, various servers, etc. in the IT systems. Unlike the IT systems, behavior of the IT systems is usually uncertain and unpredictable. However, behavior of the industrial control systems is of high certainty. For example: after an industrial control system is installed and debugged, and put into operation, the configuration thereof is basically determined.

In the embodiments of the present invention, in consideration of the certainty of the behavior of the industrial control system, and based on the certainty of such a behavior, a behavior model for the industrial control system is obtained by way of counting, and the behavior model also has definite certainty. A judgement regarding an abnormal system behavior is made based on the relatively determined behavior model, so that the obtained determination result is more accurate. Moreover, in the embodiments of the present invention, a data source related to the industrial control system is properly selected, and data is acquired from the selected data source, so that the behavior model for the industrial control system is determined according to the acquired data. Then, based on the determined data model, it is determined whether the industrial control system exhibits abnormal behavior. Effective monitoring of the network security of the industrial control system can be thus implemented.

Firstly, during the selection of a data source, a data source that can measure whether the industrial control system meets a network security requirement is selected, so that data used as a basis during subsequent judgment regarding an abnormal system behavior can more cater to the need for network security, and a determination result is more accurate. Secondly, when the industrial control system is not subjected to a network attack, data is acquired from the selected data source, and then time-varying features of the acquired data are counted to serve as a behavior model for the industrial control system. In this way, a normal behavior feature of the system can be accurately learned, so that the determination result for the abnormal system behavior that is obtained during subsequent feature comparison is more accurate.

In the embodiments of the present invention, a network security monitoring system may be used to implement monitoring of the network security of an industrial control system. The network security monitoring system may comprise at least one device. When comprising only one device, the network security monitoring system may also be referred to as a network security monitoring device. In the embodiments of the present invention, the network security monitoring system may be located inside the industrial control system or may be located outside the industrial control system.

The embodiments of the present invention will be described in detail below with reference to the accompanying drawings.

Figure 1B:
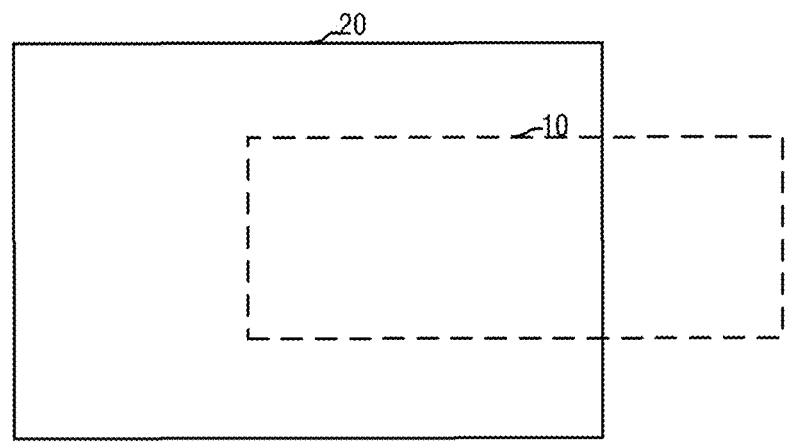
Figure 1C:
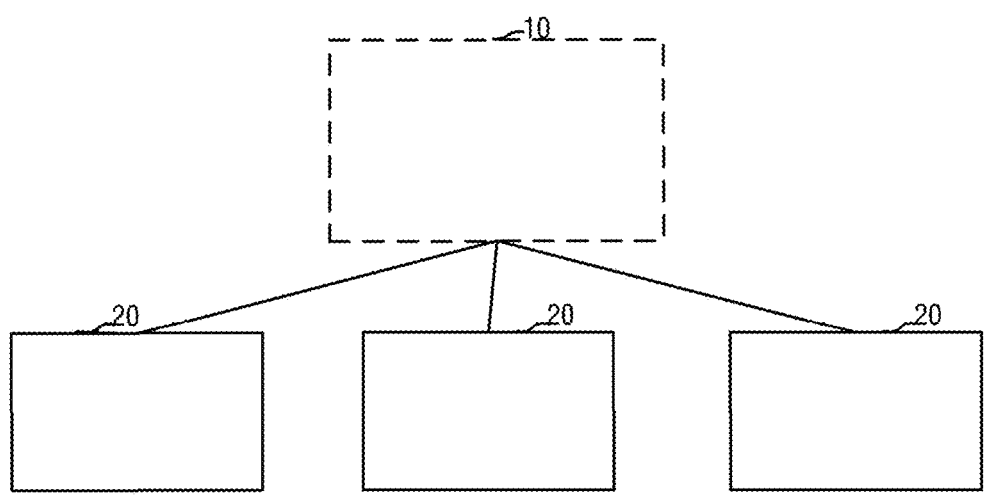

FIGS. 1A to 1C show how a network security monitoring system 10 is deployed into an industrial control system 20 in an embodiment of the present invention.

In FIG. 1A, the network security monitoring system 10 is located inside the industrial control system 20.

In FIG. 1B, some devices in the network security monitoring system 10 are located inside the industrial control system 20, and some devices therein are located outside the industrial control system 20.

In FIG. 1C, the network security monitoring system 10 is located outside the industrial control system 20. The network security monitoring system 10 may be used to monitor the network security of one industrial control system 20, and may also be used to monitor the network security of two or more network security monitoring systems 10.

The network security monitoring system 10 may implement monitoring of the network security of the industrial control system 20 by way of at least one server and monitoring software deployed thereon.

Figure 2:
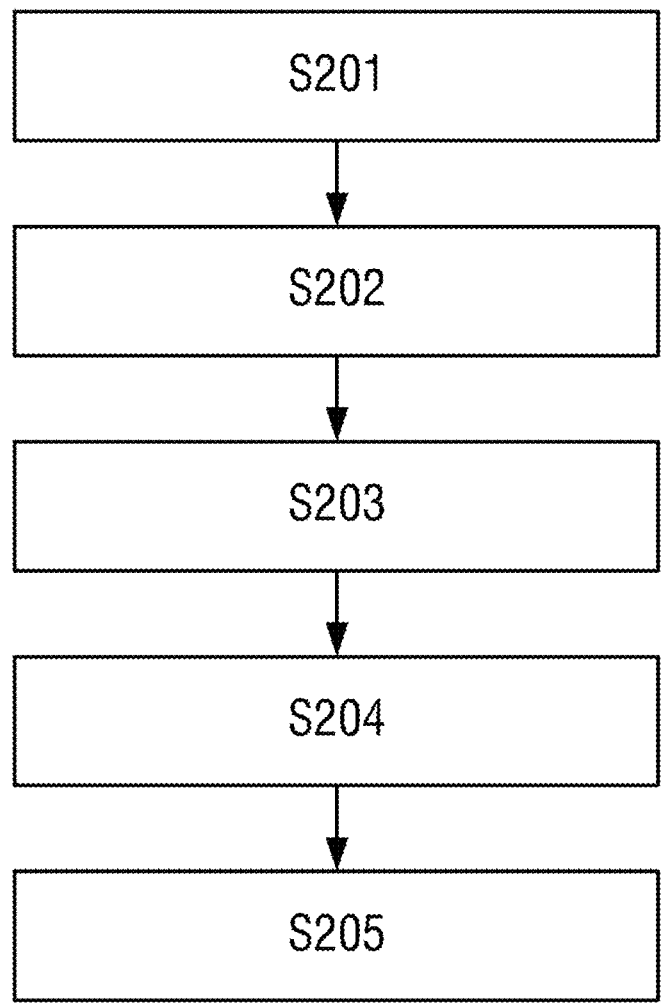
FIG. 2 is a flowchart of a network security monitoring method provided in an embodiment of the present invention.

A method for monitoring the network security of an industrial control system 20 by a network security monitoring system 10 in an embodiment of the present invention is described in detail below. As shown in FIG. 2, the method may comprise the following steps:

S201: selecting a data source;
S202: acquiring first data;
S203: obtaining a behavior model based on the first data by way of counting;
S204: acquiring second data; and
S205: making a judgment regarding an abnormal behavior based on the second data and the behavior model.

The steps above will be described below in detail one by one.

[Step S201]

In step S201, the network security monitoring system 10 selects at least one first data source related to the industrial control system 20.

Since running environments of different industrial control systems are different, the network security monitoring system 10 may first determine a network security requirement of the industrial control system 20 when selecting the first data source. For example: the network security monitoring system 10 may use a threat and risk assessment (TRA) method to determine a network security requirement. The network security monitoring system 10 may determine the network security requirement of the industrial control system 20 according to at least one of the following factors:

at least one running indicator of the industrial control system 20 that is defined by a customer of the industrial control system 20;

at least one network security policy of the industrial control system 20 that is defined by the customer of the industrial control system 20;

a normal running process of the industrial control system 20;

configuration information of at least one constituent part of the industrial control system 20; and a network attack that the industrial control system 20 may be subjected to.

Then, the network security monitoring system 10 may select the first data source according to the determined network security requirement. The first data source is used for measuring whether the industrial control system 20 meets the determined network security requirement.

The network attack may come from inside the industrial control system 20. For example: a malicious employee introducing a network attack such as a virus, or an employee inadvertently enabling a USB flash drive infected with malicious software to access the industrial control system 20, etc., may bring network attacks on the industrial control system 20.

The network attack may also come from outside the industrial control system 20. For example: according to open source or commercial threat intelligence, outside the industrial control system 20, it may be known packets coming from which IP address may be network attacks, or which types of files may be network attacks, or network traffic exhibiting which features may be network attacks.

A structure of the industrial control system 20 will be exemplified below with reference to FIG. 3 to facilitate understanding the position of the first data source in the industrial control system 20.

Figure 3:
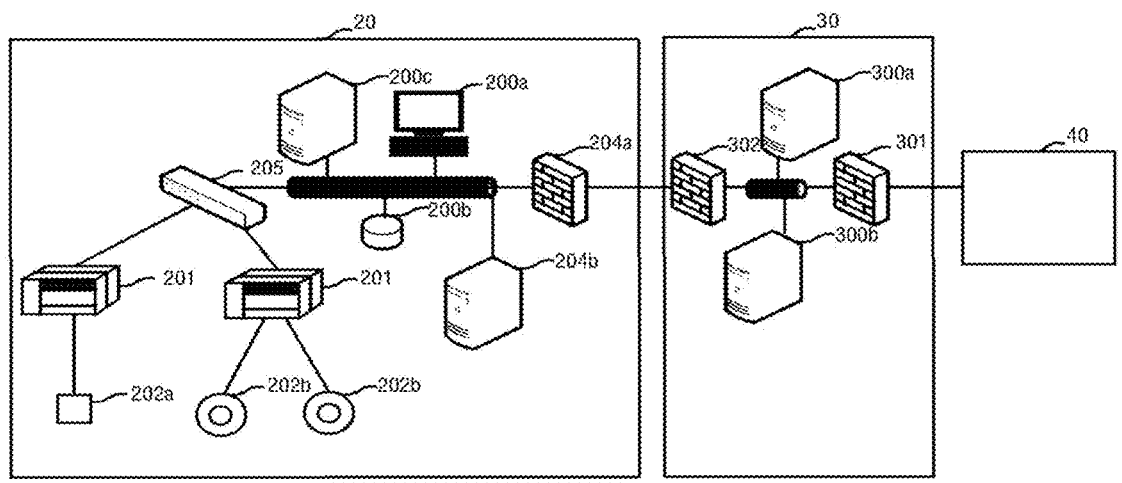
FIG. 3 is a schematic diagram of an industrial control system.

As shown in FIG. 3, the industrial control system 20 may comprise:

at least one industrial controller 201, wherein the industrial controller 201 may comprise but is not limited to a programmable logic controller (PLC), a programmable automation controller (PAC), etc.;

at least one field device, such as a sensor 202a, and an electric motor 202b, wherein the sensor 202a may acquire field data such as temperature, humidity, pressure, and a liquid flow rate under the control of the industrial controller 201, and the electric motor 202b may be driven to move under the control of the industrial controller 201;

at least one industrial host, such as an engineer station (ES) 200a, an operator station (OS), a human machine interface (HMI), a database server 200b, and an application server 200c;

at least one security protective device, such as a firewall 204a, and a server 204b for intrusion detection, wherein the security fire prevention device such as the firewall 204a, and the server 204b for intrusion detection may also compose one intrusion detection system (IDS), so as to implement the intrusion detection of the industrial control system 20; and at least one network switching and routing device 205, such as an industrial switch, and an industrial router, wherein these network switching and routing devices 205 may compose one industrial Ethernet, so as to implement interconnection of devices inside the industrial control system 20.

The first data source determined by the network security monitoring system 10 may come from inside the industrial control system 20, for example:

a log of at least one industrial host in the industrial control system 20, for example, a log for recording the CPU occupancy rate of the industrial host, etc.;

network traffic captured from at least one critical network position in the industrial control system 20; and/or a security log of at least one security protective device in the industrial control system 20, for example: a log for recording of a user entering a wrong password for login; and a network log of at least one network switching and routing device (for example, a router, a switch, etc.) in the industrial control system 20.

The critical network position where the captured network traffic is located may be defined by itself, for example: the captured network traffic is located at the firewall 204a, at a core network switching and routing device, between the industrial controller 101 and the industrial host, at the industrial controller 101, at the database server 200b, etc.

[Steps S202 and S203]

In step S202, the network security monitoring system 10 acquires the first data from the at least one first data source when the industrial control system 20 is not subjected to a network attack. In step S203, the network security monitoring system 10 counts time-varying features of the first data to serve as a behavior model for the industrial control system 20.

As described previously, unlike IT systems, behavior of industrial control systems is of high certainty. Therefore, in this embodiment of the present invention, based on the certainty, the network security monitoring system 10 acquires a behavior feature of the industrial control system 20 by way of data counting when the industrial control system 20 is not subjected to a network attack, so as to serve as a standard for subsequently determining that behavior of the industrial control system 20 is abnormal.

It should be noted that, in one possible case, the network security monitoring system 10 can acquire the first data when the industrial control system 20 is not subjected to a network attack at all. Another possible case is that a part or some parts in the industrial control system 20 or might be being subjected to network attacks when the network security monitoring system 10 acquires the first data. These network attacks may affect features of the first data at a certain first data source. One optional solution is as follows: because the behavior model indicates time-varying features of the first data, the network security monitoring system 10 may screen out data samples obviously different from other data samples in advance, and then count data to determine behavior features so as to obtain behavior features of normal behavior of the industrial control system 20. Another optional solution is to assess the current situation of the industrial control system 20 before acquiring the first data, to determine whether the industrial control system 20 has been subjected to a network attack, and then to acquire the first data if it is determined that the industrial control system is not subjected to a network attack.

A method for acquiring data and determining behavior features by the network security monitoring system 10 will be exemplified below.

1) Behavior Features of an Industrial Host

The at least one first data source comprises a log of at least one industrial host in the industrial control system 20. The network security monitoring system 10 acquires, for each of the industrial hosts, at least one piece of the following data from a log of the industrial host to serve as the first data of the industrial host:

hardware performance data during running of the industrial host, such as a central processing unit (CPU) occupancy rate, and a memory occupancy rate;

file input/output information during running of the industrial host;

a processing flow for an industrial application program running on the industrial host, for example: a processing flow for an industrial application program running on the application server 200c; and a resource in the industrial control system 20 that is accessed by the industrial application program running on the industrial host, for example: a file, a registry, a database, a memory object, etc. accessed by a portable electronic device.

The network security monitoring system 10 may record the acquired changes of the first data as a function of time to serve as a time sequence. After a period of observations, the time-varying features of the first data may be obtained by way of counting, for example: an average value of the CPU occupancy rate, time-varying variance of the memory occupancy rate, etc. A normal processing flow for an industrial application program, a list of files accessed during normal running, a list of registries, etc. may also be obtained. The network security monitoring system 10 may determine these features as behavior features of the industrial host.

2) Features of Network Communication

The at least one first data source comprises network traffic captured from at least one critical network position in the industrial control system 20. The network security monitoring system 10 may determine, for each of the at least one critical network position, at least one piece of the following information of the network traffic to serve as the first data of the critical network position:

a source address of a data packet in the network traffic, for example: a source medium access control (MAC) address, a source Internet protocol (IP) address, and a source port number (port);

a destination address of the data packet in the network traffic, for example: a destination MAC address, a destination IP address, and a destination port number;

a function code of an industrial control communication protocol used by the network traffic, for example: a function code of S7Comm and of PROFINET; and application layer data (payload) in the network traffic.

The network security monitoring system 10 may acquire the first data at the critical network position in a manner of port mapping or wiretapping.

The network security monitoring system 10 may record the acquired changes of the first data as a function of time to serve as a time sequence. After a period of observations, the time-varying features of the first data may be obtained by way of counting, that is, the features of network communication, including but not limited to:

a communication flow between an industrial host and an industrial controller in the industrial control system 20;

a function performed by an industrial application program in the industrial control system 20; and the state of an industrial device in the industrial control system 20 and the state of a process variable monitored by the industrial device.

3) Behavior Features of a User of the Industrial Control System 20

The at least one first data source comprises a log of at least one industrial host in the industrial control system. The network security monitoring system 10 acquires at least one piece of the following information from the at least one industrial host to serve as the first data:

information for logging in and/or logging out of the industrial control system by the user by way of the at least one industrial host;

a control command executed by the user on the at least one industrial host for the industrial control system; and data in the industrial control system that is accessed by the user by way of the at least one industrial host.

The network security monitoring system 10 may record the acquired changes of the first data as a function of time to serve as a time sequence. After a period of observations, the time-varying features of the first data may be obtained by way of counting, that is, the behavior features of the user, including but not limited to: a working time, a normal operation, a data acquisition mode, etc. For example, an HMI always accesses a specific PLC every two seconds to acquire a control state, which is a time-varying behavior feature of the HMI.

[Step S204]

In step S204, the network security monitoring system 10 acquires the second data from some or all of the at least one first data source.

[Step S205]

In step S205, the network security monitoring system 10 determines whether the second data has the features described by the behavior model, and if so, determines that behavior of the industrial control system 20 that is represented by the second data is normal behavior, and if not, determines that the behavior is abnormal behavior.

For example: in step S203, the behavior model obtained by way of counting comprises: a specific HMI only accesses a specific PLC. Then, according to the second data acquired in step S204, that is, a log of the HMI, if the HMI accessed other PLCs, it is determined that the access behavior is abnormal behavior.

As another example: in step S203, the behavior model obtained by way of counting comprises: a CPU occupancy rate of an operator station does not exceed 40%. Then, according to the second data acquired in step S204, that is, a log of the operator station, if the CPU occupancy rate exceeds 50%, it is determined that the industrial control system 20 exhibits abnormal behavior. If it is determined in step S205 that the behavior of the industrial control system 20 that is represented by the second data is abnormal behavior, optionally, alarm reporting may be performed by using the method shown in FIG. 4.

Figure 4:
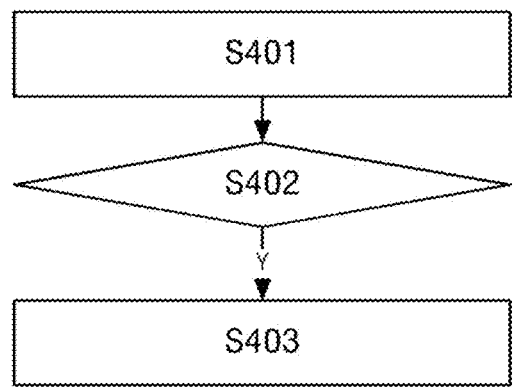
FIG. 4 is a flowchart of an alarming method provided in an embodiment of the present invention.

As shown in FIG. 4, an embodiment of the present invention further provides a hierarchical alarming method, wherein the method comprises the following steps:

S401: determining a level of an alarm corresponding to the behavior of the industrial control system 20 that is represented by the second data;

S402: determining whether the level determined in step S401 is higher than a preset lowest alarm priority level, and if so, performing step S403, otherwise, skipping performing step S403; and S403: triggering alarm reporting.

Unlike IT systems, industrial control systems are typical cyber-physical systems (CPS). The most critical devices for an industrial control system are industrial controllers and field devices that control the physical world, and therefore, these devices have higher requirements for network security. Relatively, a manufacturing execution system (MES) and an enterprise resource planning (ERP) system in an enterprise network that are at a management level have requirements for network security that are not higher than requirements of the industrial controllers and the field devices. To avoid excessive security-related alarm reporting, a level of the previously described alarm and the lowest alarm priority level may be preset. When the industrial control system 20 exhibits abnormal behavior, the method shown in FIG. 4 is used to first determine an alarm level corresponding to the abnormal behavior, and if the alarm level is higher than the preset lowest alarm priority level, alarm reporting is performed, otherwise, alarm reporting is not performed, which effectively reduces the reporting of low-level alarms.

In order to implement the isolation of the industrial control system from the enterprise network, a demilitarized zone (DMZ) may be arranged between the industrial control system and the enterprise network to place, in the DMZ, some devices such as servers accessible to a network outside the industrial control system. The DMZ usually comprises a front-end firewall, a back-end firewall, and other devices and applications for data exchange, such as OPC servers. The DMZ is isolated from the enterprise network by way of the front-end firewall, and the industrial control system is isolated from the DMZ by way of the back-end firewall.

In this embodiment of the present invention, optionally, as shown in FIG. 3, the DMZ 30 is isolated from the industrial control system 20 by way of the back-end firewall 302, and the DMZ 30 is isolated from the enterprise network 40 by way of the front-end firewall 301. A file transfer protocol (FTP) server 300a, a mail server 300b, etc. may be deployed in the DMZ 30. Security policies may be respectively set on the front-end firewall 301 and the back-end firewall 302, so as to prevent the enterprise network 40 from directly communicating with the industrial control system by way of the DMZ 30. An anti-virus mechanism based on a blacklist or a whitelist may also be deployed on an industrial host of the industrial control system 20. In addition, an additional firewall or virtual private network (VPN) may also be deployed on the industrial controller 101, so as to ensure the security of communication between the industrial host and the industrial controller 101.

Figure 5:
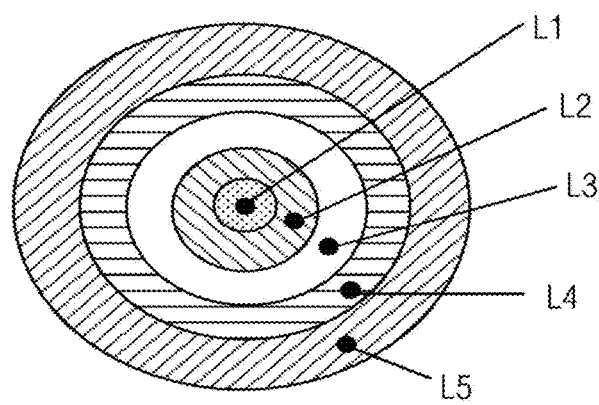
FIG. 5 is a schematic diagram of hierarchical alarming in the alarming method provided in the embodiment of the present invention.

Optionally, as shown in FIG. 5, the levels of alarms in descending order of priorities sequentially comprise at least two of the following levels:

a first level L1, wherein alarms at the first level comprise alarms related to an industrial controller in the industrial control system 20;

a second level L2, wherein alarms at the second level comprise alarms in an industrial control network in the industrial control system 20;

a third level L3, wherein alarms at the third level comprise alarms related to an industrial host (for example, an operator station, and an engineer station) in the industrial control system 20;

a fourth level L4, wherein alarms at the fourth level comprise alarms related to the back-end firewall 302, server and/or application in the demilitarized zone 30; and a fifth level L5, wherein alarms at the fifth level comprise alarms related to the front-end firewall 301 in the demilitarized zone 30.

The alarms related to the front-end firewall 301 are of the lowest level because an attack source can only detect the demilitarized zone 30.

The alarms related to the back-end firewall 302 or the server and/or application in the demilitarized zone 30 are set to be alarms with a slightly high priority because an attack source has been able to penetrate through the demilitarized zone 30 and may interfere with communication and application between the industrial control system 20 and the enterprise network 40, but is not accessible to the industrial control system 20.

The alarms related to the industrial host in the industrial control system 20 are of a higher priority because these alarms indicate that an attack source has been accessible to management-level devices such as an engineer station, an HMI device, and a server in the industrial control system 20, and has already posed a relatively great threat to the industrial control system 20.

If the behavior of the attack source continues to expand and has infiltrated into a control network, that is, having an impact on a network communication between a management level and a control level, i.e. a network communication between the industrial host and the industrial controller 101, it indicates that a greater threat has been imposed on the industrial control system 20. Therefore, the alarms related to the network communication in the industrial control system 20 have a higher priority.

Alarms with the highest priority occur when an attack source has gained access to the industrial controller 101 or even to the field device to manipulate a control operation.

The above hierarchical method is only taken as an example. In fact, as long as the alarm can be reported hierarchically according to the security threat to the industrial control system 20, an important alarm can be preferentially processed. By distinguishing the priorities of alarms, maintenance personnel can spend a relatively large amount of time and effort in processing higher-priority alarms without paying too much attention to lower-priority alarms.

Optionally, in this embodiment of the present invention, after determining that the behavior of the industrial control system that is represented by the second data is abnormal behavior, the network security monitoring system 10 may further determine whether the behavior of the industrial control system that is represented by the second data is a network attack, and if so, position an attack source according to an object targeted by the behavior of the industrial control system that is represented by the second data.

Figure 6:
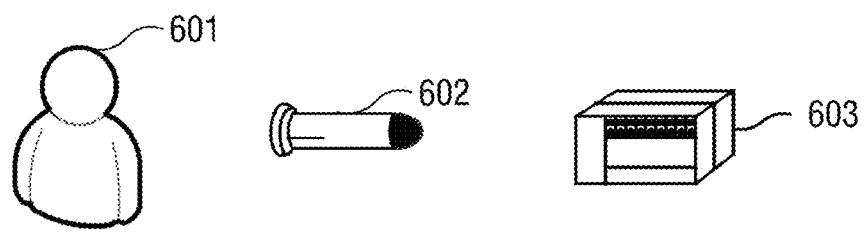
FIG. 6 shows three important factors for a network attack.

For one network attack, there are three important factors shown in FIG. 6:

an attack source 601, a security threat 602, and an attack target 603.

The attack source 601 may come from inside the industrial control system 20 and/or outside the industrial control system 20, and aims to attack the industrial control system 20. The attack source 601 may come from hackers, malicious organizations, or even malicious countries, or may come from malicious employees, former employees, joint venture companies, etc.

The security threat 602 is a capability and/or a mechanism used by the attack source 601 to attack the industrial control system 20.

The attack target 603 may be the industrial controller 101, the network switching and routing device 205 in the industrial control system 20, control operations and flows of the industrial host, or even important data in the industrial control system 20.

The attack target 603 may also be referred to as assets in the industrial control system 20. The aforesaid first data source may be state data of these assets in the industrial control system 20. The network security monitoring system 10 may acquire state data, i.e. the aforesaid first data, of these assets by deploying an data acquisition apparatus at these assets, and store the first data as historical data.

When determining, by using step S205 mentioned previously, that the behavior of the industrial control system 20 is abnormal, the network security monitoring system 10 may determine, based on the above-mentioned historical data, whether the abnormal behavior is a network attack. The network attack comprises but is not limited to: malicious software, a phishing mail, a vulnerability detection, a violent password attack, etc.

If determining that the abnormal behavior is a network attack, the network security monitoring system 10 may determine the attack source 601 according to the abnormal behavior, for example:

determining a geographical position where the attack source 601 is located, according to a source IP address of the attack source 601, a domain name system (DNS) and/or other acquired data; and according to the properties of the network attack, for example: a hash value, indication information, information related to network communication (for example, information related to a domain name system, a hypertext transfer protocol), etc., matching the attack source 601 with a known attack source. Thus, the tactics, techniques, and procedures (TTP) for the network attack are identified.

In addition, optionally, after determining that the abnormal behavior of the industrial control system 20 is a network attack, the network security monitoring system 10 may further determine a network attack phase of the abnormal behavior, wherein different network attack phases pose different levels of threats to the industrial control system 20. The network attack phases comprise but are not limited to the following phases:

1) Reconnaissance Phase (Reconnaissance)

In the reconnaissance phase, the attack source 601 may study, identify, and select the attack target 603, i.e. assets in the industrial control system 20. For example: a meeting agenda, a list of mail addresses, social relationship information, etc. may be acquired from the Internet website through crawler technology.

2) Weaponization Phase (Weaponization)

In the weaponization phase, remote access Trojans are placed in transmittable payloads by way of automation tools, etc., and these transmittable payloads may be referred to as "weapons". These transmittable payloads comprise but are not limited to: client application data files such as a portable document format (PDF) file, a Microsoft Office file, etc.

3) Weapon Delivery Phase (Delivery)

In the weapon delivery phase, the attack target 603 is attacked by exploiting a weapon in manners comprising but not limited to: a mail attachment, a website, a universal serial bus (USB) pluggable medium.

4) Exploitation Phase (Exploitation)

After the attack target 603 has been attacked by exploiting a weapon, an attack code starts to be triggered. Usually, the attack target 603 comprises the vulnerability in an application program or an operating system. Alternatively, characteristics of a user or an operating system of the industrial control system 20 may also be simply exploited so as to execute a segment of codes that is automatically to be executed.

5) Installation Phase (Installation)

In the installation phase, a remote Trojan or backdoor may be installed on the attack target 603, so as to implement continuous operations on the industrial control system 20.

6) Command and Control Phase (C2)

In the command and control phase, the attack target 603 establishes a C2 channel with an external Internet server. An intruder manually operates the attack source 601 to implement a direct operation on the attack target 603.

7) Actions on Objective Phase (Actions on Objective)

After the above-mentioned six phases, the intruder may directly operate the attack target 603. For example: Data infiltration (data exfiltration), such as data collection, data encryption, and information extraction, may be performed for the attack target 603, so as to destroy the data integrity and availability of the attack target 603. In addition, the intruder may also use the attack target 603 as an intermediate point, so as to go deeper into the interior of the industrial control system 20.

Through analysis of the above-mentioned network attack phases, the performance, mechanisms, and technologies of the network attacks in different phases may be studied, real security threats may be identified, appropriate measures may be taken to prevent the network attack, and then the network security of the industrial control system 20 may be further predicted.

Figure 7:
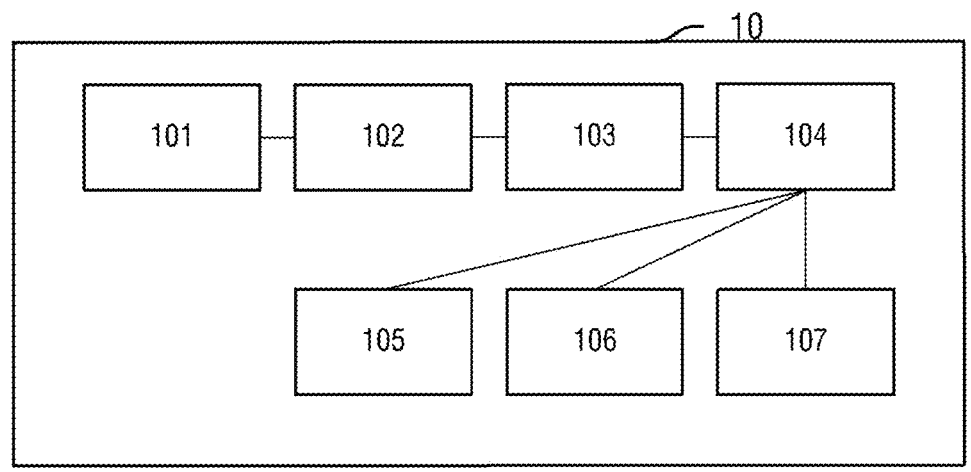
FIG. 7 is a schematic structural diagram of a network security monitoring system provided in an embodiment of the present invention.

FIG. 7 is a schematic structural diagram of the network security monitoring system 10 provided in an embodiment of the present invention. The network security monitoring system may be used to implement the above-mentioned network security monitoring method. As shown in FIG. 7, the network security monitoring system 10 may comprise:

a data source selection module 101 for selecting at least one first data source related to the industrial control system 20, wherein the at least one first data source is used for measuring whether the industrial control system meets a network security requirement;

a data acquisition module 102 for acquiring first data from the at least one first data source;

a model generation module 103 for counting time-varying features of the first data to serve as a behavior model for the industrial control system, wherein the data acquisition module 102 is further used for acquiring second data from some or all of the at least one first data source; and an abnormal behavior determination module 104 for determining whether the second data has the features described by the behavior model, and if so, determining that behavior of the industrial control system that is represented by the second data is normal behavior, and if not, determining that the behavior is abnormal behavior.

Optionally, the data source selection module 101 is specifically used for selecting the at least one first data source related to the industrial control system 20 according to at least one of the following factors: at least one running indicator of the industrial control system 20 that is defined by a customer of the industrial control system 20; at least one network security policy of the industrial control system 20 that is defined by the customer of the industrial control system 20; a normal running process of the industrial control system 20; configuration information of at least one constituent part of the industrial control system 20; and a network attack that the industrial control system 20 may be subjected to.

Optionally, the at least one first data source selected by the data source selection module 101 comprises: a log of at least one industrial host in the industrial control system 20, and/or network traffic captured from at least one critical network position in the industrial control system 20, and/or a security log of at least one security protective device in the industrial control system 20, and/or a network log of at least one network switching and routing device in the industrial control system 20.

Optionally, the at least one first data source selected by the data source selection module 101 comprises the log of the at least one industrial host in the industrial control system 20, and the data acquisition module 102 is specifically used for acquiring, for each of the at least one industrial host, at least one piece of the following data from the log of the industrial host to serve as the first data of the industrial host: hardware performance data during running of the industrial host; file input/output information during running of the industrial host; a processing flow for an industrial application program running on the industrial host; and a resource in the industrial control system 20 that is accessed by the industrial application program running on the industrial host.

Optionally, the at least one first data source selected by the data source selection module 101 comprises the network traffic captured from the at least one critical network position in the industrial control system 20, and the data acquisition module 102 is specifically used for determining, for each of the at least one critical network position, at least one piece of the following information of the network traffic to serve as the first data of the critical network position: a source address of a data packet in the network traffic; a destination address of the data packet in the network traffic; a function code of an industrial control communication protocol used by the network traffic; and application layer data in the network traffic.

In this case, the behavior model generated by the model generation module 103 is used to describe at least one of the following features of communication within the industrial control system 20: a communication flow between an industrial host and an industrial controller in the industrial control system 20; a function performed by an industrial application program in the industrial control system 20; and the state of an industrial device in the industrial control system 20 and the state of a process variable monitored by the industrial device.

Optionally, the at least one first data source selected by the data source selection module 101 comprises the log of the at least one industrial host in the industrial control system 20, and the data acquisition module 102 is specifically used for acquiring at least one piece of the following information from the at least one industrial host to serve as the first data: information for logging in and/or logging out of the industrial control system 20 by the user by way of the at least one industrial host; a control command executed by the user on the at least one industrial host for the industrial control system 20; and data in the industrial control system 20 that is accessed by the user by way of the at least one industrial host.

For this case, the behavior model generated by the model generation module 103 is used to describe at least one of the following features of user behavior of the industrial control system 20: a working time; a normal operation; and a data acquisition mode.

Optionally, the network security monitoring system 10 further comprises an alarm processing module 105, wherein after the abnormal behavior determination module 104 determines that the behavior of the industrial control system 20 that is represented by the second data is abnormal behavior, the alarm processing module is used for: determining a level of an alarm corresponding to the behavior of the industrial control system 20 that is represented by the second data; and triggering alarm reporting if the determined level is higher than a preset lowest alarm priority level, otherwise, skipping triggering alarm reporting.

The levels of the alarms in descending order of priorities sequentially comprise at least two of the following levels: a first level, wherein alarms at the first level comprise alarms related to an industrial controller in the industrial control system 20; a second level, wherein alarms at the second level comprise alarms in an industrial control network in the industrial control system 20; a third level, wherein alarms at the third level comprise alarms related to an industrial host in the industrial control system 20; a fourth level, wherein alarms at the fourth level comprise alarms related to a back-end firewall, server and/or application in a demilitarized zone 30, and the demilitarized zone 30 is used for separating the industrial control system 20 from an enterprise network 40 of the industrial control system 20; and a fifth level, wherein alarms at the fifth level comprise alarms related to the front-end firewall in the demilitarized zone 30.

Optionally, the network security monitoring system 10 further comprises an attack source positioning module 106, wherein after the abnormal behavior determination module 104 determines that the behavior of the industrial control system 20 that is represented by the second data is abnormal behavior, the attack source positioning module is used for: determining whether the behavior of the industrial control system 20 that is represented by the second data is a network attack; and if so, positioning an attack source according to an object targeted by the behavior of the industrial control system 20 that is represented by the second data.

Optionally, the network security monitoring system 10 further comprises an attack phase determination module 107, wherein after the abnormal behavior determination module 104 determines that the behavior of the industrial control system 20 that is represented by the second data is abnormal behavior, the attack phase determination module is used for: determining whether the behavior of the industrial control system 20 that is represented by the second data is a network attack; and if so, determining a network attack phase of the behavior of the industrial control system 20 that is represented by the second data, wherein different network attack phases pose different levels of threats to the industrial control system 20.

Other optional implementations of the network security monitoring system may be implemented with reference to the network security monitoring method mentioned previously, which is not described herein again.

Figure 8:
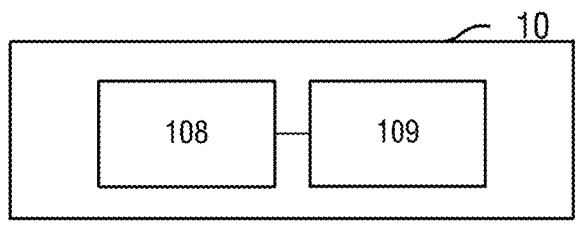
FIG. 8 is another schematic structural diagram of the network security monitoring system provided in the embodiment of the present invention.

FIG. 8 is another schematic structural diagram of the network security monitoring system 10 provided in the embodiment of the present invention. The network security monitoring system 10 may also be used to implement the network security monitoring method mentioned previously. As shown in FIG. 8, the network security monitoring system 10 may comprise: at least one memory 108 for storing machine-readable instructions; and at least one processor 109 for invoking the machine-readable instructions, so as to carry out the network security monitoring method provided in this embodiment of the present invention.

Figure 9:
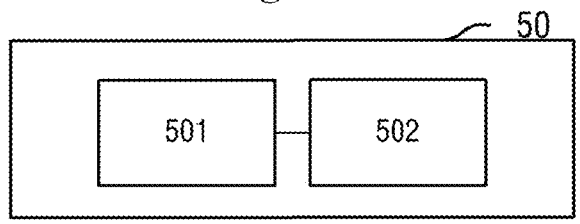
FIG. 9 is a schematic structural diagram of an alarm processing apparatus provided in an embodiment of the present invention.

FIG. 9 is a schematic structural diagram of an alarm processing apparatus 50 provided in an embodiment of the present invention. The alarm processing apparatus 50 may be used to implement the alarming method mentioned previously. As shown in FIG. 9, the alarm processing apparatus 50 may comprise:

an alarm level determination module 501 for determining a level of an alarm generated in the industrial control system 20; and an alarm reporting module 502 for triggering alarm reporting when the level of the alarm is higher than a preset lowest alarm priority level, and skipping triggering alarm reporting when the level of the alarm is not higher than the preset lowest alarm priority level.

The levels of the alarms in descending order of priority sequentially comprise at least two of the following levels: a first level, wherein alarms at the first level comprise alarms related to an industrial controller in the industrial control system 20; a second level, wherein alarms at the second level comprise alarms in an industrial control network in the industrial control system 20; a third level, wherein alarms at the third level comprise alarms related to an industrial host in the industrial control system 20; a fourth level, wherein alarms at the fourth level comprise alarms related to a back-end firewall, server and/or application in a demilitarized zone 30, and the demilitarized zone 30 is used for separating the industrial control system 20 from an enterprise network 40 of the industrial control system 20; and a fifth level, wherein alarms at the fifth level comprise alarms related to the front-end firewall in the demilitarized zone 30.

For other optional implementations of the alarm processing apparatus 50, reference may be made to the alarming method mentioned previously, which is not described herein again.

Figure 10:
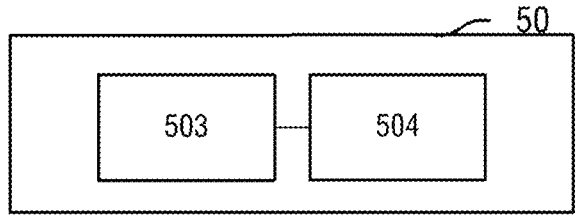
FIG. 10 is another schematic structural diagram of the alarm processing apparatus provided in the embodiment of the present invention.

FIG. 10 is another schematic structural diagram of the alarm processing apparatus 50 provided in the embodiment of the present invention. The alarm processing apparatus 50 may also be used to implement the alarming method mentioned previously. As shown in FIG. 10, the alarm processing apparatus 50 may comprise: at least one memory 503 for storing machine-readable instructions; and at least one processor 504 for invoking the machine-readable instructions, so as to carry out the alarming method provided in this embodiment of the present invention.

The machine-readable medium provided in the embodiments of the present invention stores machine-readable instructions thereon that, when executed by a processor, cause the processor to carry out any one of the methods mentioned previously. Specifically, a system or apparatus equipped with a machine-readable medium may be provided, and the machine-readable medium stores thereon software program codes that implement the functions of any one of the embodiments described above, and cause a computer or processor for the system or apparatus to read and execute machine-readable instructions stored in the machine-readable medium.

In this condition, the program codes per se read from the machine-readable medium may implement the functions of any one of the embodiments described above, and therefore the machine-readable codes and the machine-readable medium storing the machine-readable codes constitute a part of the present invention.

The embodiments of the machine-readable medium comprise a floppy disk, a hard disk, a magnetic optical disk, a compact disk (such as CD-ROM, CD-R, CD-RW, DVD-ROM, DVD-RAM, DVD-RW and DVD+RW), a magnetic tape, a non-volatile memory card and ROM. Optionally, the program codes may be downloaded from a server computer or a cloud via a communication network.

It needs to be noted that not all the steps and modules in the flow and structural diagrams of the system described above are necessary, and some steps or modules may be omitted according to practical requirements. The execution order of the various steps is not fixed and may be adjusted according to requirements. The structure of the system described in the various embodiments above may be a physical structure and may also be a logical structure, i.e. some modules may be implemented by the same physical entity, or some modules may be implemented separately by a plurality of physical entities, or may be implemented jointly by some components in a plurality of independent devices.

In the various embodiments above, a hardware unit may be implemented mechanically or electrically. For example, a hardware unit may comprise a permanent dedicated circuit or logic (such as a dedicated processor, FPGA or ASIC) to accomplish a corresponding operation. The hardware unit may also comprise a programmable logic or circuit (such as a general-purpose processor or other programmable processors), and may be set temporarily by software to accomplish a corresponding operation. The specific implementation (mechanically, or a dedicated permanent circuit, or a temporarily set circuit) may be determined in consideration of cost and time.

The present invention is illustrated and described in detail above by way of drawings and preferred embodiments; however, the present invention is not limited to these disclosed embodiments. Based on the plurality of embodiments described above, those skilled in the art would know that code checking modules/programs in different embodiments above may be combined to obtain more embodiments of the present invention, and these embodiments also fall within the scope of protection of the present invention.

The invention claimed is:

1. A method for monitoring network security of an industrial control system, the method comprising:
   determining a network security requirement of the industrial control system based on a running environment of the industrial control system;
   selecting at least one first data source related to the industrial control system based on at least the network security requirement, the at least one first data source being for measuring whether the industrial control system meets the network security requirement;
   acquiring first data from the at least one first data source;
   counting time-varying features of the first data to serve as a behavior model for the industrial control system;
   acquiring second data from at least some of the at least one first data source;
   determining whether the second data includes features described by the behavior model;
   determining, upon determining that the second data includes the features described by the behavior model, that behavior of the industrial control system represented by the second data is normal behavior;
   determining, upon determining that the second data does not include the features described by the behavior model, that the behavior of the industrial control system represented by the second data is abnormal behavior; and
   upon determining that the behavior of the industrial control system represented by the second data is abnormal behavior, determining a level of an alarm among a plurality of alarm levels corresponding to the behavior of the industrial control system represented by the second data, a lowest alarm priority level among the plurality of alarm levels including alarms related to a front-end firewall, and either triggering alarm reporting, upon the level being higher than the lowest alarm priority level among the plurality of alarm levels, or skipping the triggering of the alarm reporting, upon the level not being higher than the lowest alarm priority level among the plurality of alarm levels, wherein the network security requirement is determined according to at least one running indicator of the industrial control system defined by a customer of the industrial control system.

2. The method of claim 1, wherein the network security requirement is further determined according to at least one of a normal running process of the industrial control system,
configuration information of at least one constituent part of the industrial control system, or
a network attack that the industrial control system may be subjected to.

3. The method of claim 1, wherein the at least one first data source comprises at least one of a log of at least one industrial host in the industrial control system,
network traffic captured from at least one critical network position in the industrial control system,
a security log of at least one security protective device in the industrial control system, or
a network log of at least one network switching and routing device in the industrial control system.

4. The method of claim 3, wherein the at least one first data source includes the log of the at least one industrial host in the industrial control system; and the acquiring of the first data from the at least one first data source includes acquiring, for each industrial host among the at least one industrial host, at least one piece of data from a log of the industrial host to serve as the first data of the industrial host, the at least one piece of data including at least one of hardware performance data during running of the industrial host,
file input/output information during running of the industrial host,
a processing flow for an industrial application program running on the industrial host, or
a resource in the industrial control system accessed by the industrial application program running on the industrial host.

5. The method of claim 3, wherein the at least one first data source includes the network traffic captured from the at least one critical network position in the industrial control system; and the acquiring of the first data from the at least one first data source includes determining, for each critical network position among the at least one critical network position, at least one piece of data of the network traffic to serve as the first data of the critical network position, the at least one piece of data including at least one of a source address of a data packet in the network traffic,
a destination address of the data packet in the network traffic,
a function code of an industrial control communication protocol used by the network traffic, or
application layer data in the network traffic.

6. The method of claim 3, wherein the at least one first data source includes the log of the at least one industrial host in the industrial control system; and the acquiring of the first data from the at least one first data source includes acquiring at least one piece of data from the at least one industrial host to serve as the first data, the at least one piece of data including at least one of information for at least one of logging in and logging out of the industrial control system by a user via the at least one industrial host,
a control command executed by the user on the at least one industrial host for the industrial control system, or
data in the industrial control system accessed by the user via the at least one industrial host.

7. The method of claim 1, wherein the plurality of alarm levels, in descending order of priority, sequentially comprise at least two of a first level, wherein alarms at the first level include alarms related to an industrial controller in the industrial control system,
a second level, wherein alarms at the second level include alarms in an industrial control network in the industrial control system,
a third level, wherein alarms at the third level include alarms related to an industrial host in the industrial control system,
a fourth level, wherein alarms at the fourth level include alarms related to at least one of a back-end firewall, server or application in a demilitarized zone, the demilitarized zone being usable for separating the industrial control system from an enterprise network of the industrial control system, or
a fifth level, wherein alarms at the fifth level include alarms related to the front-end firewall, the front-end firewall being in the demilitarized zone.

8. The method of claim 1, wherein upon determining that the behavior of the industrial control system represented by the second data is abnormal behavior, the method further comprises:

determining whether the behavior of the industrial control system represented by the second data is a network attack; and positioning, upon determining that the behavior is the network attack, an attack source according to an object targeted by the behavior of the industrial control system represented by the second data.

9. The method of claim 1, wherein after determining that the behavior of the industrial control system represented by the second data is abnormal behavior, the method comprises:

determining whether the behavior of the industrial control system represented by the second data is a network attack; and determining, upon determining that the behavior is the network attack, a network attack phase of the behavior of the industrial control system represented by the second data, wherein different network attack phases pose different levels of threat to the industrial control system.

10. The method of claim 8, wherein after determining that the behavior of the industrial control system represented by the second data is abnormal behavior, the method comprises:

determining whether the behavior of the industrial control system represented by the second data is a network attack; and determining, upon determining that the behavior is the network attack, a network attack phase of the behavior of the industrial control system represented by the second data, wherein different network attack phases pose different levels of threat to the industrial control system.

11. A network security monitoring system for an industrial control system, the network security monitoring system comprising:

at least one memory to store machine-readable instructions; and at least one processor configured to execute the machine-readable instructions to perform at least determining a network security requirement of the industrial control system based on a running environment of the industrial control system, selecting at least one first data source related to the industrial control system based on the network security requirement, the at least one first data source being for measuring whether the industrial control system meets the network security requirement, acquiring first data from the at least one first data source, counting time-varying features of the first data to serve as a behavior model for the industrial control system, acquiring second data from at least some of the at least one first data source, determining whether the second data has features described by the behavior model, determining, upon determining that the second data includes the features described by the behavior model, that behavior of the industrial control system represented by the second data is normal behavior, determining, upon determining that the second data does not include the features described by the behavior model, that the behavior of the industrial control system represented by the second data is abnormal behavior, and upon determining that the behavior of the industrial control system represented by the second data is abnormal behavior, determining a level of an alarm among a plurality of alarm levels corresponding to the behavior of the industrial control system represented by the second data, a lowest alarm priority level among the plurality of alarm levels including alarms related to a front-end firewall; and either triggering alarm reporting, upon the level being higher than the lowest alarm priority level among the plurality of alarm levels, or skipping the triggering of the alarm reporting, upon the level not being higher than the lowest alarm priority level among the plurality of alarm levels, wherein the network security requirement is determined according to at least one running indicator of the industrial control system defined by a customer of the industrial control system.

12. The network security monitoring system of claim 11, wherein the at least one first data source comprises at least one of:

a log of at least one industrial host in the industrial control system, network traffic captured from at least one critical network position in the industrial control system, a security log of at least one security protective device in the industrial control system, or a network log of at least one network switching and routing device in the industrial control system.

13. The network security monitoring system of claim 12, wherein the at least one first data source includes the log of the at least one industrial host in the industrial control system; and the at least one processor is configured to execute the machine-readable instructions to perform acquiring, for each industrial host among the at least one industrial host, at least one piece of data from a log of the industrial host to serve as the first data of the industrial host, the at least one piece of data including at least one of hardware performance data during running of the industrial host, file input/output information during running of the industrial host, a processing flow for an industrial application program running on the industrial host, or a resource in the industrial control system accessed by the industrial application program running on the industrial host.

14. The network security monitoring system of claim 12, wherein the at least one first data source includes the network traffic captured from the at least one critical network position in the industrial control system; and the at least one processor is configured to execute the machine-readable instructions to perform determining, for each critical network position among the at least one critical network position, at least one piece of data of the network traffic to serve as the first data of the critical network position, the at least one piece of data including at least one of a source address of a data packet in the network traffic, a destination address of the data packet in the network traffic, a function code of an industrial control communication protocol used by the network traffic, or application layer data in the network traffic.

15. The network security monitoring system of claim 12, wherein the at least one first data source includes the log of the at least one industrial host in the industrial control system; and the at least one processor is configured to execute the machine-readable instructions to perform acquiring at least one piece of data from the at least one industrial host to serve as the first data, the at least one piece of data including at least one of information for at least one of logging in and logging out of the industrial control system by a user via the at least one industrial host, a control command executed by the user on the at least one industrial host for the industrial control system, or data in the industrial control system accessed by the user via the at least one industrial host.

16. The network security monitoring system of claim 11, wherein the plurality of alarm levels, in descending order of priority, sequentially comprise at least two of:

a first level, wherein alarms at the first level include alarms related to an industrial controller in the industrial control system;

a second level, wherein alarms at the second level include alarms in an industrial control network in the industrial control system;

a third level, wherein alarms at the third level include alarms related to an industrial host in the industrial control system;

a fourth level, wherein alarms at the fourth level include alarms related to at least one of a back-end firewall, server or application in a demilitarized zone, the demilitarized zone being usable for separating the industrial control system from an enterprise network of the industrial control system; or a fifth level, wherein alarms at the fifth level include alarms related to the front-end firewall, the front-end firewall being in the demilitarized zone.

17. The network security monitoring system of claim 11, wherein upon determining that the behavior of the industrial control system represented by the second data is abnormal behavior, the at least one processor is configured to execute the machine-readable instructions to perform at least:

determining whether the behavior of the industrial control system represented by the second data is a network attack; and positioning, upon determining that the behavior is the network attack, an attack source according to an object targeted by the behavior of the industrial control system represented by the second data.

18. The network security monitoring system of claim 11, wherein upon determining that the behavior of the industrial control system represented by the second data is abnormal behavior, the at least one processor is configured to execute the machine-readable instructions to perform at least:

determining whether the behavior of the industrial control system represented by the second data is a network attack; and determining, upon determining that the behavior is the network attack, a network attack phase of the behavior of the industrial control system represented by the second data, wherein different network attack phases pose different levels of threat to the industrial control system.

19. The network security monitoring system of claim 17, wherein upon determining that the behavior of the industrial control system represented by the second data is abnormal behavior, the at least one processor is configured to execute the machine-readable instructions to perform at least:

determining whether the behavior of the industrial control system represented by the second data is a network attack; and determining, upon determining that the behavior is the network attack, a network attack phase of the behavior of the industrial control system represented by the second data, wherein different network attack phases pose different levels of threat to the industrial control system.

20. A non-transitory machine-readable medium storing machine-readable instructions, wherein the machine-readable instructions, when executed by at least one processor, cause the at least one processor to carry out a method comprising:

determining a network security requirement of an industrial control system based on a running environment of the industrial control system;

selecting at least one first data source related to the industrial control system based on the network security requirement, the at least one first data source being for measuring whether the industrial control system meets the network security requirement;

acquiring first data from the at least one first data source;

counting time-varying features of the first data to serve as a behavior model for the industrial control system;

acquiring second data from at least some of the at least one first data source;

determining whether the second data includes features described by the behavior model;

determining, upon determining that the second data includes the features described by the behavior model, that behavior of the industrial control system represented by the second data is normal behavior;

determining, upon determining that the second data does not include the features described by the behavior model, that the behavior of the industrial control system represented by the second data is abnormal behavior, and upon determining that the behavior of the industrial control system represented by the second data is abnormal behavior, determining a level of an alarm among a plurality of alarm levels corresponding to the behavior of the industrial control system represented by the second data, a lowest alarm priority level among the plurality of alarm levels including alarms related to a front-end firewall; and either triggering alarm reporting, upon the level being higher than the lowest alarm priority level among the plurality of alarm levels, or skipping the triggering of the alarm reporting, upon the level not being higher than the lowest alarm priority level among the plurality of alarm levels, wherein the network security requirement is determined according to at least one running indicator of the industrial control system defined by a customer of the industrial control system.

21. The non-transitory machine-readable medium of claim 20, wherein the plurality of alarm levels, in descending order of priority, sequentially include at least two of a first level, wherein alarms at the first level include alarms related to an industrial controller in the industrial control system, a second level, wherein alarms at the second level include alarms in an industrial control network in the industrial control system, a third level, wherein alarms at the third level include alarms related to an industrial host in the industrial control system, a fourth level, wherein alarms at the fourth level include alarms related to at least one of a back-end firewall, server or application in a demilitarized zone, the demilitarized zone being usable for separating the industrial control system from an enterprise network of the industrial control system, or a fifth level, wherein alarms at the fifth level include alarms related to the front-end firewall, the front-end firewall being in the demilitarized zone.

22. The non-transitory machine-readable medium of claim 20, wherein after determining that the behavior of the industrial control system represented by the second data is abnormal behavior, the method comprises:

determining whether the behavior of the industrial control system represented by the second data is a network attack; and upon determining that the behavior of the industrial control system is the network attack,
positioning an attack source according to an object targeted by the behavior of the industrial control system that is represented by the second data, or
determining a network attack phase of the industrial control system represented by the second data, wherein different network attack phases pose different levels of threats to the industrial control system.

* * * * *